United States Patent [19]

James

[11] Patent Number: 5,354,124
[45] Date of Patent: Oct. 11, 1994

[54] WATER SEALED, CABLE REINFORCED VEHICLE ENDLESS TRACK AND CLEAT ASSEMBLY

[75] Inventor: M. Elmer James, Mendon, Utah
[73] Assignee: LMC Operating Corp., Logan, Utah
[21] Appl. No.: 116,998
[22] Filed: Sep. 7, 1993
[51] Int. Cl.$^5$ ............................................. B62D 55/24
[52] U.S. Cl. .................. 305/35 EB; 305/38; 305/54
[58] Field of Search .............. 305/24, 35 R, 35 EB, 305/38, 39, 54

[56] References Cited

U.S. PATENT DOCUMENTS

| | | | |
|---|---|---|---|
| 3,416,845 | 12/1968 | Scanland | 305/38 |
| 3,747,995 | 7/1973 | Russ, Sr. | 305/35 EB |
| 3,758,174 | 9/1973 | Mazurek | 305/35 EB |
| 3,765,731 | 10/1973 | Kilbane, Jr. | 305/35 EB |
| 4,059,315 | 11/1977 | Jolliffe | 305/35 EB |
| 4,281,882 | 8/1981 | van der Lely | 305/35 EB |
| 4,560,211 | 12/1985 | van der Lely | 305/35 EB |
| 4,714,302 | 12/1987 | Svensson et al. | 305/38 |
| 5,199,771 | 4/1993 | James | 305/54 |
| 5,201,574 | 4/1993 | James | 305/35 EB |

FOREIGN PATENT DOCUMENTS

| | | | |
|---|---|---|---|
| 3808711 | 9/1989 | Fed. Rep. of Germany | 305/58 R |
| 4283180 | 10/1992 | Japan | 305/38 |

*Primary Examiner*—Russell D. Stormer
*Attorney, Agent, or Firm*—A. Ray Osburn

[57] ABSTRACT

A flexible belt assembly for the endless track of an off-road vehicle reinforced by longitudinal cables vulcanized within a rubberlike cover. A grouser clamping plate is similarly vulcanized into the cover, with laterally extending ends to which the grousers are bolted, so that no cleat mounting holes are required through the flexible belt itself, excluding all water and ice from the interior of the belt to increase its longevity. The belt construction is energy efficient in that it is of increased flexibility over previous fabric reinforced belt designs.

11 Claims, 6 Drawing Sheets

(19) United States Patent — 5,354,124

WATER SEALED, CABLE REINFORCED VEHICLE ENDLESS TRACK AND CLEAT ASSEMBLY

BACKGROUND OF THE INVENTION

1. Field

The field of the invention is endless track assemblies for snow grooming vehicles, and more particularly the belt and cleat assemblies thereof, including structures for fastening the cleats to the flexible belting used in such tracks.

2. State of the Art

Snow groomer vehicles use endless tracks made up of fabric reinforced flexible plastic belts made continuous by lacing their ends together. Actual lacing thread may be used, although lacing joint assemblies are more commonly employed, being combinations of metallic hinge plates and associated hinge pins. The snow grooming vehicle commonly has an endless track assembly on each of its sides, each comprising a number of the fabric reinforced plastic belts. The belts are spaced apart to provide a broad base for the track while utilizing minimum amounts of belting. Steel cleat assemblies are bolted across the individual belts at intervals, tieing them together into a track assembly. Holes for cleat mounting bolts are provided through the belts. Each assembled track is engaged by a power-transmitting sprocket wheel, which forces the belts to travel together around a set of guiding wheels called bogies. The powered belt imparts horizontal shear forces to the cleats, which engage the snow to propel the vehicle. Extensive development has gone into the design of the elongate cleat members, with the objectives of providing maximum forward traction along with substantial resistance to side slipping. Cleat constructions are disclosed in U.S. Pat. Nos. 3,765,731, 4,560,211, 4,281,882, 4,059,315 5,199,771 and 5,201,574. Typically, the ground contacting cleat, also called a "grouser", is fastened to the outside of the flexible belting by bolt and nut assemblies installed in matching holes through the grouser, the belt, and a metal backing plate on the inside of the belt. A large number of bolt and nut assemblies are required to spread the high shearing forces among the belt holes. The horizontal force on the ground engaging part of the cleat also results in high moment loads which must be resisted by the stems of the bolts. Failure of the bolts in bending is a too frequent common occurrence. U.S. Pat. No. 5,201,574 and application Ser. No. 08/096,187 disclose assemblies designed to substantially decrease cleat mounting bolt failures. The present application however is directed to improvements in the structure of the belt itself, as well as to cleat attachment provisions.

Prior art endless belts utilize a fabric reinforced plastic. The belt must be substantially non-elastic in tension but flexible enough to bend to pass around the sprocket and bogies. The need for tensile strength has resulted in quite thick, stiff track belts incorporating high percentages of the stretch resisting fabric. Because of the stiffness of the belt, a very significant amount of power must be expended to continually force it to bend about the sprocket and bogies during operation. A more flexible, stretch resisting belt with the requisite high tensile strength is needed.

The prior art methods of attachment of the cleat assemblies also requires that the belts be stiff and thick. Considerable belt thickness is needed to resist high forces which bear against the sides of the mounting bolt holes. The cleat loosening from bolt hole deformation and enlargement is an ever present problem. This loosening inevitably occurs from creep of the plastic material under both operational and clamping forces over extended periods.

This loosening is serious in itself, but it also leads to ingress of water into the very center of the belt structure. Soaking action reduces belt structure integrity and leads to reduced belt life. The belts must operate in cold weather, so that the penetrating water freezes with still further destructive results.

The need then is not only for a more flexible belt, but also for a method of cleat attachment which will not allow ingress of water into the interior of the plastic of the belt.

BRIEF SUMMARY OF THE INVENTION

With the foregoing in mind, the disadvantages of prior art endless track assemblies are substantially overcome, by providing an endless track system design which does not require mounting bolt holes to be provided through the plastic belting, which is molded of urethane or other rubberlike material. Belting strength is provided not by embedded fabric, but by internal, vulcanized in place, steel cables continuous the full length of the belt. The ends of the steel cables are preferably brazed into blind holes in dovetailing lacing assemblies. The cables and the lacing assemblies are sealed against water by the vulcanized plastic belt material. Also vulcanized in place within the belt assembly are spaced apart grouser mounting plates. Only extending end portions are left uncovered by the vulcanized plastic of the belt. Grousers are bolted to holes provided in the clamping plate through the end portions outside the plastic material of the belt. No holes through the plastic are required. Shearing forces from the grousers are transferred into the clamping plates through clamping bolt assemblies, and thence through the plastic of the belt to the longitudinal cables. On the grouser side of the belt, pairs of molded lateral projections may be employed to provide grouser socketing slots to help prevent grouser slipping under vehicle propulsion loads. The belting is substantially more flexible than that of the prior art designs, both because it is generally thinner and because the plastic acts only as a waterproofing cover and does not include non-elastic fabric provided for strength in prior art designs. Therefore, the inventive belt assembly is much more highly energy efficient on the vehicle. All potential water penetrating paths are sealed by the vulcanized covering plastic, so that ingress of internal water and destructive ice buildup are prevented.

The bolts joining the grouser clamp plate and the grouser are selected to resist the shearing and bending force inputs from the track system during vehicle operation. Since the grouser mounting bolts must, as with prior art designs, resist potential bending forces from the grousers, it is preferred that bolt and nut designs such as disclosed in U.S. Pat. No. 5,201,574 or application Ser. No. 08/096,187 be used. The former effectively removes bending forces from the critical stress concentration area at the end of the threads in the bolts, while the latter largely prevents bending stresses from being applied to the bolt. However, standard grouser clamping bolts may also be satisfactorily used.

According to one aspect of the invention, a small amount of fabric may be included in the covering plastic to lend desirable age cracking resistance. This approach would possibly sacrifice a modicum of the increased flexibility, but might be needed to preserve the water sealing feature.

It is therefore the principal object of the invention to provide an endless flexible belt assembly with associated grouser mounting and clamping provisions which eliminates problems arising from ingress of water into the internal structure of the belt and which substantially eliminates grouser mounting bolt failure.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
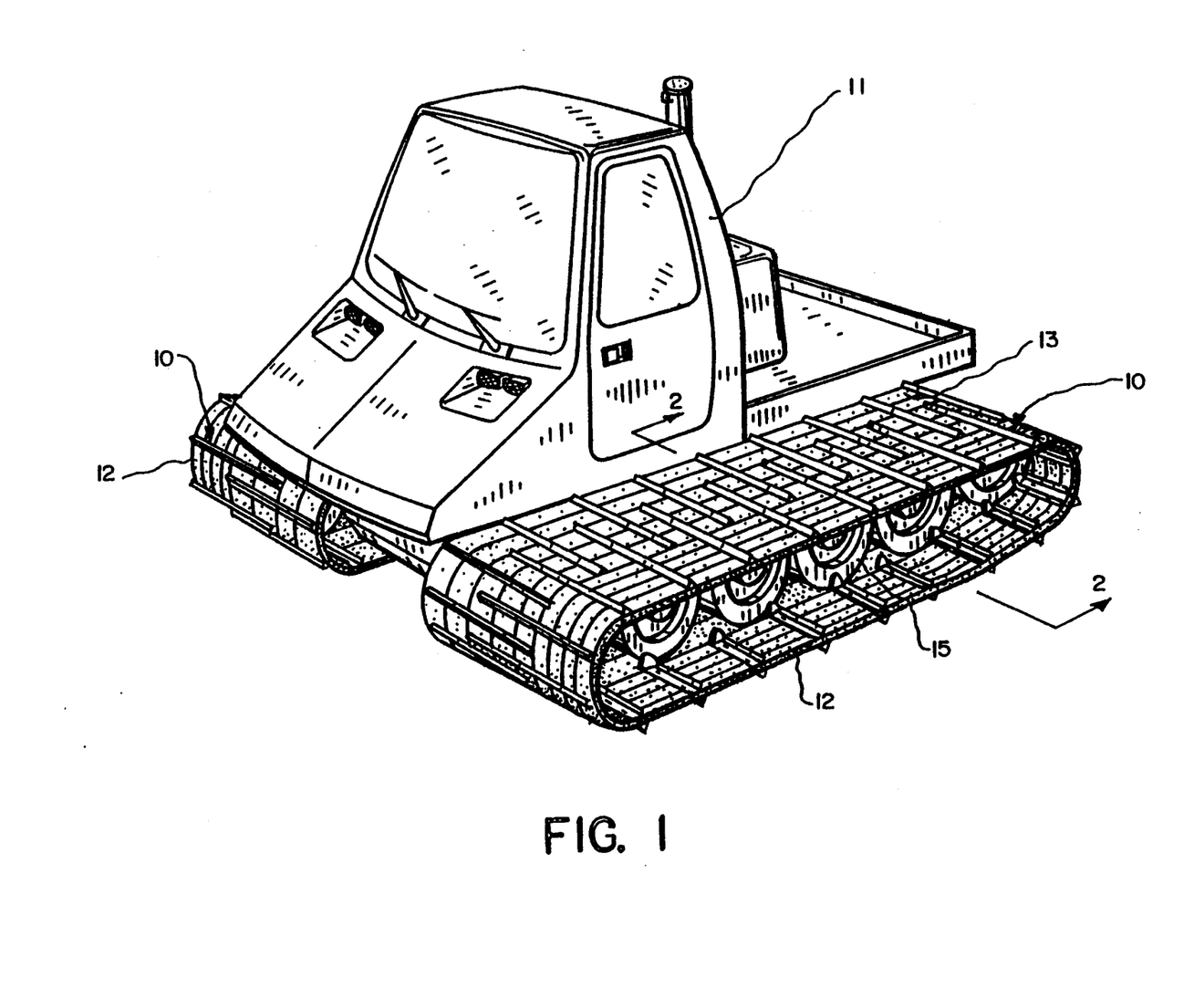
FIG. 1 is a perspective representation of an endless track vehicle incorporating the cable reinforced endless belt track of the invention, drawn to a reduced scale, FIG. 2 a cross sectional view of the endless track of FIG. 1 taken along line 2—2 thereof, drawn to a reduced scale larger than that of FIG. 1, FIG. 3 a top plan view of a fragment of the endless track of FIG. 2, drawn to a reduced scale slightly smaller than that of FIG. 2, FIG. 4 a plan view of a fragment of one of the cable reinforced flexible belt assemblies of the endless track of FIG. 1, showing the belt lacing joint, and cut away to show the reinforcing cables and the belt clamping plate, drawn to a reduced scale larger than that of FIG. 2, FIG. 5 a vertical cross sectional view of the fragment of FIG. 4, taken along line 5—5 thereof, drawn to the same scale, FIG. 6 a vertical cross sectional view of the fragment of FIG. 4 taken along line 6—6 thereof, drawn to approximately the same scale, FIG. 7 a side elevation view of a fragment of the fragment of FIG. 6, drawn inverted and to substantially full scale, showing the grouser, the clamping plate and the shim washer in section, FIG. 8 a cross sectional view of the fragment of FIG. 7, taken along line 8—8 thereof, drawn to the same scale, FIG. 9 the fragment of FIG. 7, however employing a standard grouser mounting bolt, drawn to the same scale, and FIG. 10 the fragment of FIG. 8, however employing a grouser mounting bolt with an extended stem used with a lengthened nut, drawn to the same scale.
Figure 2:
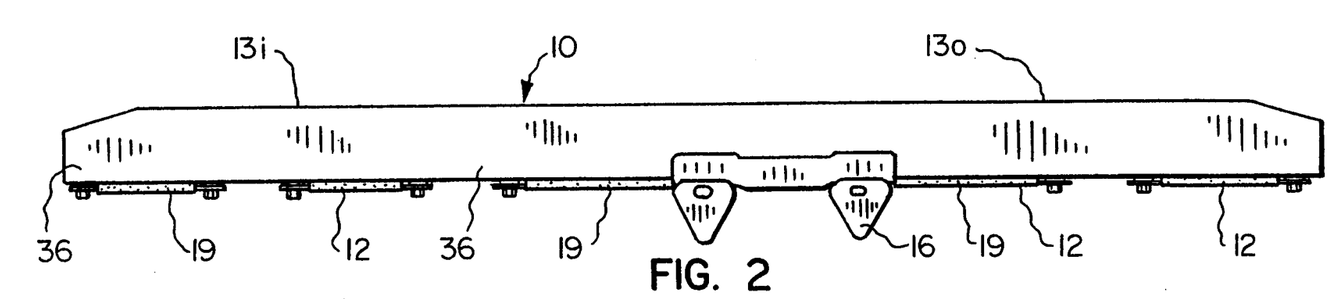
Figure 3:
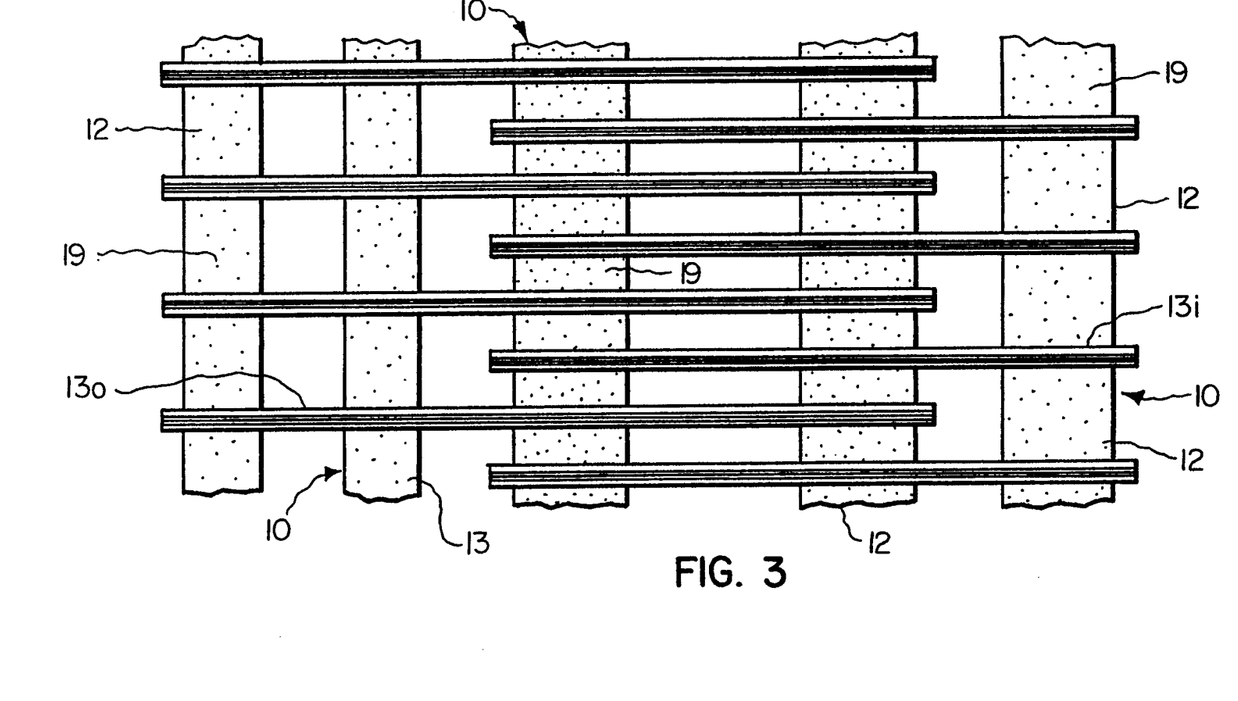

An endless belt track with a multiplicity of belt and cleat assemblies 10 generally in accordance with the invention, is shown in FIG. 1 installed upon an off-road vehicle 11. Vehicle 11 may, for example, be used to propel a snow tiller or other ski run grooming implement. The assemblies 10 each comprise a number of belt assemblies 12 incorporating continuous steel cables encased within flexible plastic. The belts 12 are spaced apart laterally upon laterally directed shaped plates 13 called grousers. (FIGS. 2–6) Lacing assemblies 14 connect opposing ends of each belt assembly 12, making each endless. (FIGS. 4–6) The belts 12 are supported on vehicle wheels 15, one being a drive sprocket engaging the grousers 13. Grousers 13 have been employed in many configurations, each calculated to provide improved traction with the snow, prevent side slip of the vehicle, or otherwise perform more desirably and efficiently. However, the present invention is concerned primarily with improved belt design and with improved methods for fastening the grousers to the belts.

Figure 4:
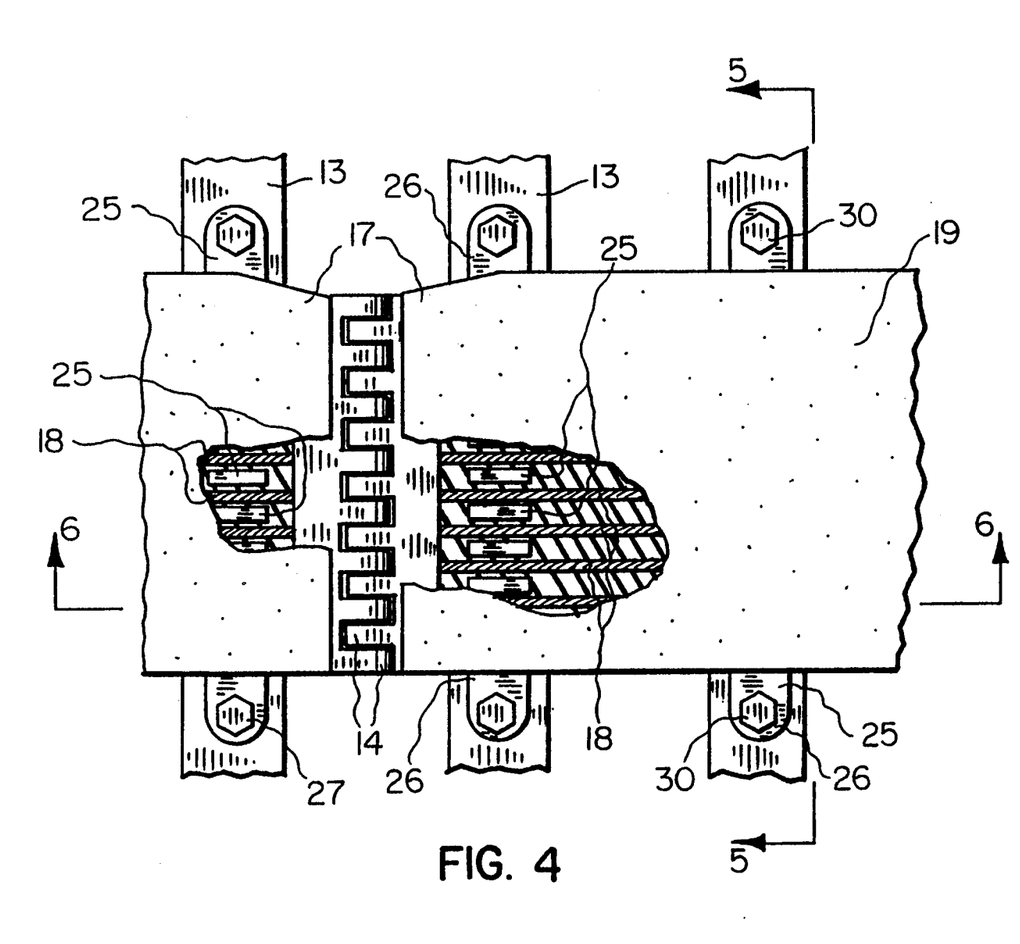
Figure 5:
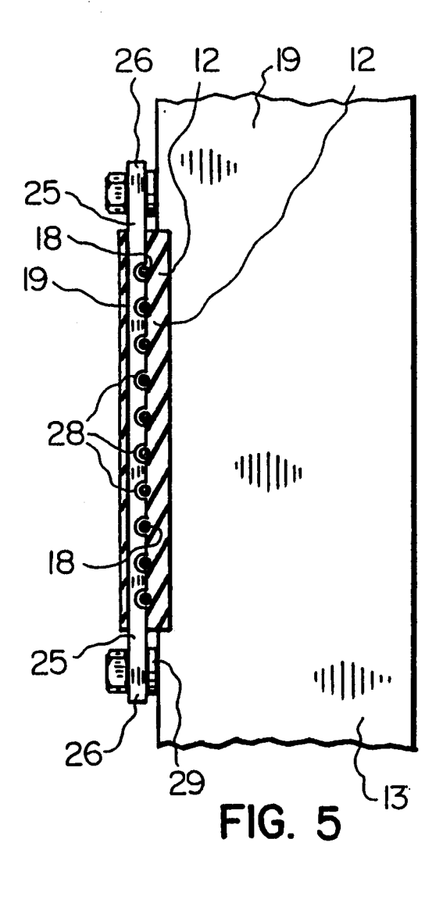
Figure 6:
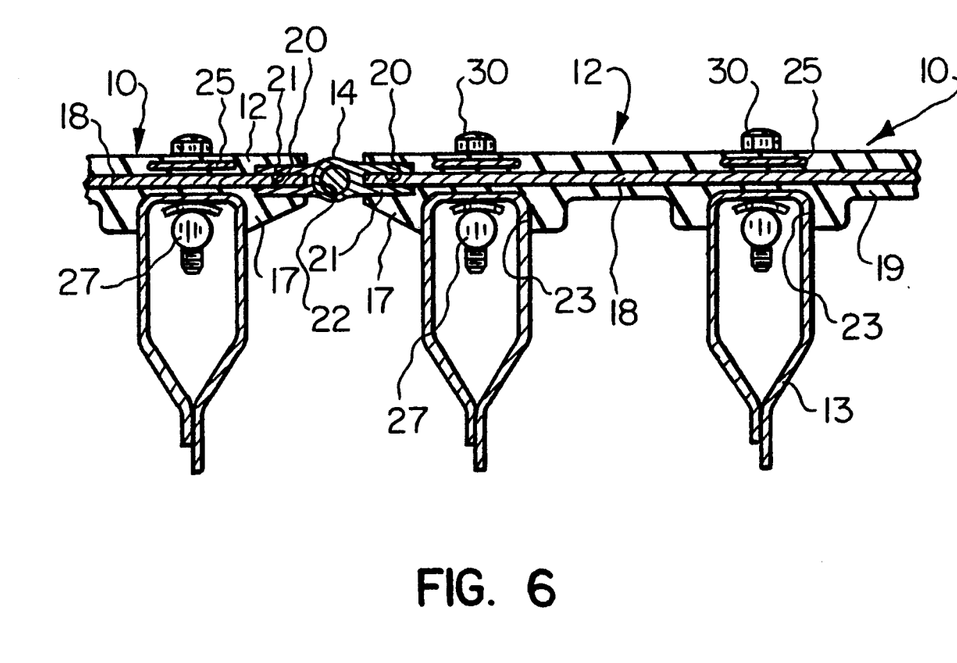

The illustrated track has three inside belts 12 used with a pair of narrower outside belts 12. (FIG. 3) Lateral inside grousers 13i are secured to the three inside belts 12. Outside grousers 13o are secured spanning the pair of outside belts 12 and the centermost two of the inside belts 12, laterally overlapping inside grousers 13i. Wheel guide assemblies 16 are bolted projecting from the overlapping grouser portions between belts 12. Belt ends 17 are attached together by the lacing hinge assemmblies 14. (FIGS. 4 & 6)

The belt and cleat assembly 10 comprises an endless belt assembly 12 incorporating a multiplicity of endless cables 18 all vulcanized embedded within a rubberlike cover 19. (FIGS. 4–8) The ends of each cable 18 are brazed in place within blind bores 20 in opposing lacing components 21 joined by a hinge pin, not shown, in a pivot bore 22. Both lacing components 21 are also vulcanized largely embedded in the rubberlike cover 19. The cables 18 each comprise multiple strands of steel wire, to be highly flexible to bend easily about the sprocket and guiding bogie wheels. The use of multiple small cables preserves flexibility while providing needed longitudinal strength and resistance to excessive lenghtening under load.

The grousers 13 are installed laterally to the belts. Preferably, grouser accepting sockets 23 are provided by raised ridges 24 molded integrally with cable cover 19. A clamping plate 25 is vulcanized into the cover 19 at each grouser. Uncovered ends 26 extending from each side of the cover accommodate grouser mounting bolt assemblies 27. Driving loads applied to grousers 13 transfer through the clamping bolts 27 to clamping plates 25 and thence through the rubberoid covering 19 to the cables 18. Grooves 28 provided across the clamping plates substantially surround each cable for efficient load transfer. Rubberlike covering 19 is substantially compressed by torquing the grouser attachment bolt assembly 27 during installation. Preferably, the grouser and mounting plate ends are forced into direct contact during installation. A shim washer 29 may be provided if necessary.

Figure 9:
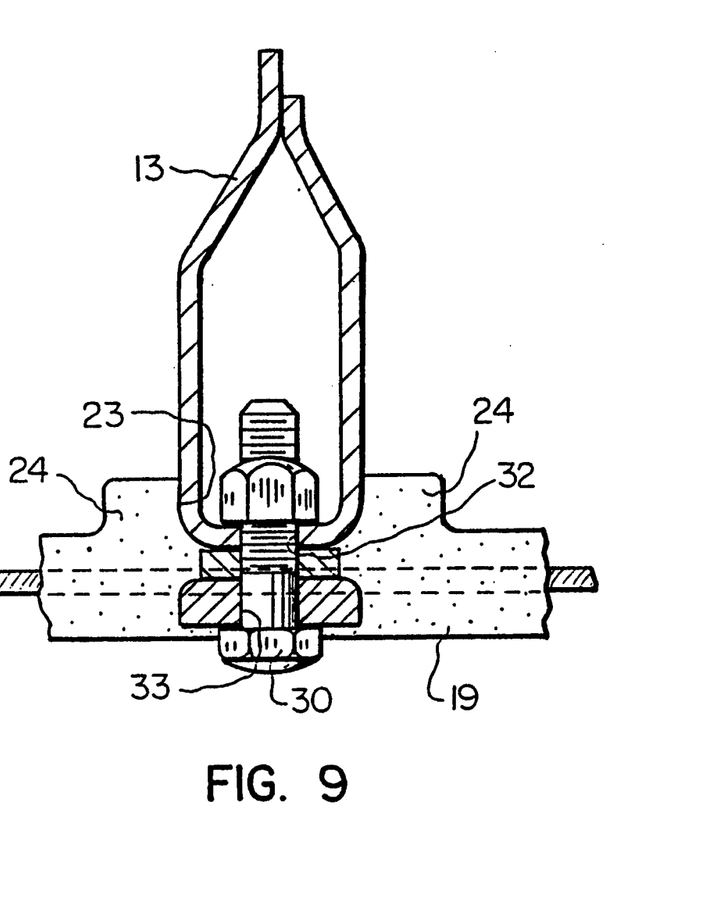

A number of alternative grouser mounting assemblies 27 may be selected to secure the clamping plate 25 to the grouser 13. A conventional prior art assembly may be used as seen in FIG. 9, although such an assembly does have disadvantages in that the inherently weaker threaded portion of the stem of bolt 30 is subjected to bending loads.

Figure 10:
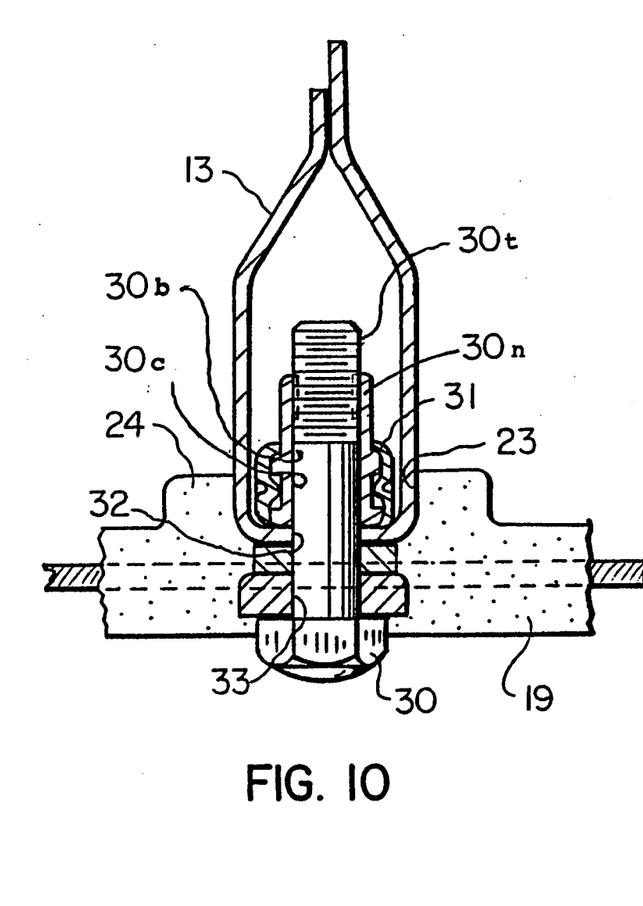

A considerably improved clamping bolt assembly 27 is shown in FIG. 10 and disclosed in more detail in U.S. Pat. No. 5,201,574. The threads 30t of the bolt 30 are in this design placed distantly from the belt to grouser interface, the location of highest bending stresses during operation of the track upon the vehicle. A lengthened nut 30n has a bore 30b threaded only at its end distant from the grouser to belt interface. The bolt threads join with an unthreaded, smooth, bolt clearing portion 30c. It is advantageous to include a nut retaining channel 31 to accurately retain the nuts in place during installation.

Figure 7:
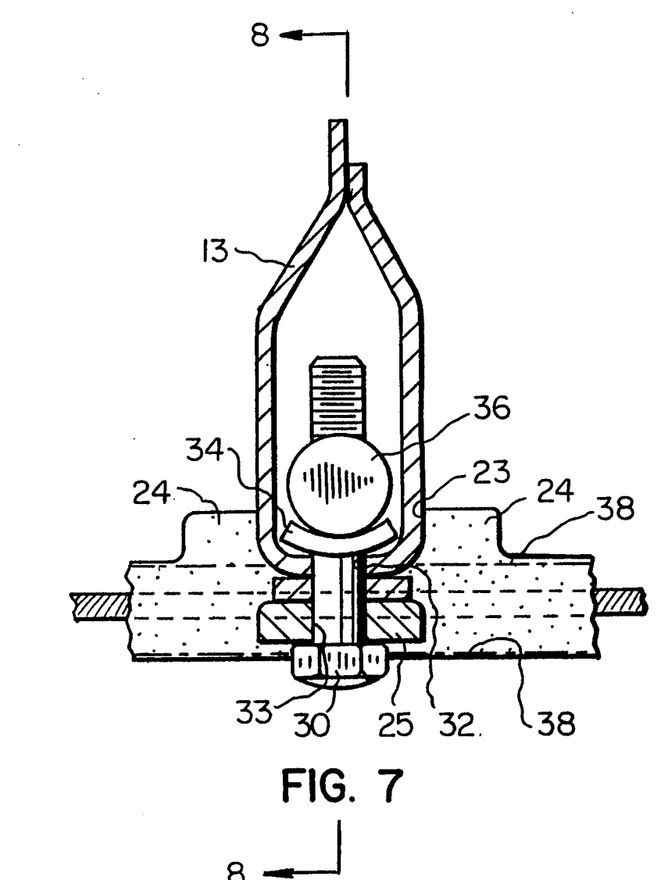
Figure 8:
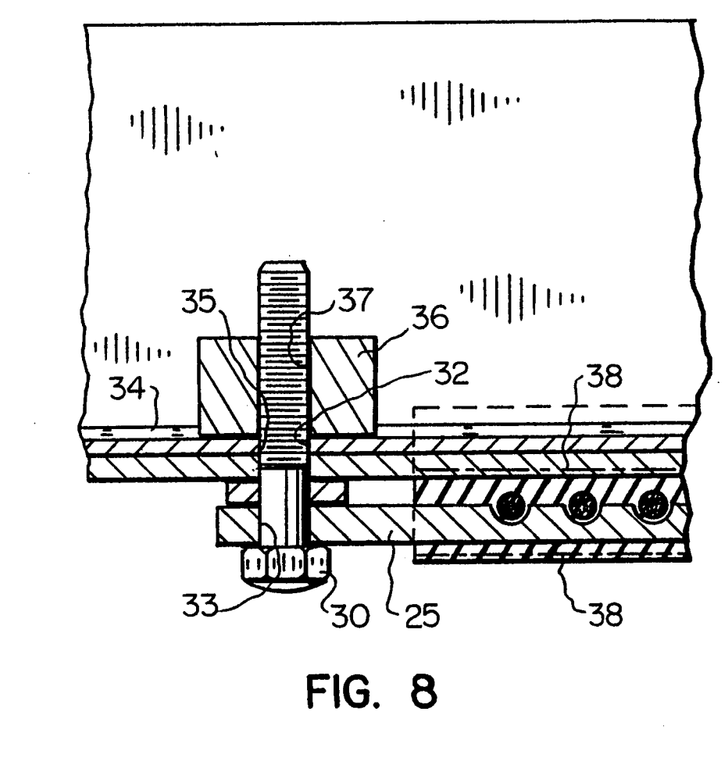

Another preferred clamping bolt assembly 27 is illustrated in FIGS. 7 and 8 and more fully disclosed in copending U.S. Pat. application Ser. No. 08/096,187 entitled Cleat Retaining Assembly for Vehicle Endless Track. This clamping bolt assembly is potentially advantageous in that the stem of clamping bolt 30 incurs no bending stresses at any location. To utilize this clamping bolt assembly, one side of the grouser 13 may be abbreviated in height to provide access. Grouser mounting holes 32 match with corresponding clamping plate mounting holes 33.

Inside each grouser 13, extending its full length is a curved, upwardly opening, elongate wear plate 34. This member has mounting holes 35 mating with those in the clamping plate and the grouser. (FIGS. 7 and 8) A cylindrical barrel nut 36 has internal threads 37 engaged by the threads of the bolt 30. Nut and bolt threads are preferably machined for interference fit, to lock together when tightened upon the belt assembly 12. Preferably, barrel nut 30 has an unthreaded guide portion for alignment with the bolt to avoid cross threading during installation. Barrel nut 36 is cylindrical and is oriented to lie along the center line of the grouser 13, making contact in a single line with wear plate 34, which also contacts grouser 13 in a single line because of its upwardly curving shape. Because of the line contact between wear plate and grouser, the bolt is during operation relieved of bending stresses. Grouser 13, rather than applying a bending load to the bolt, tends to rotate about it. Upon application of driving force, the grouser creates a normal reaction force upon the clamping plate distant from the bolt, along with a tensile force along the axis of the bolt. These forces together balance the moment from the driving force applied by the ground upon the grouser.

Other means of attaching the grouser to the clamping plate may be employed without departing from the spirit of the invention. Other changes may also be made over the belt and clamping configurations disclosed and illustrated herein. The provision of the grouser sockets within the cover material is not essential to the invention, for example, although this arrangement does provide enhanced shearing resistance against grouser forces and helps to transfer load to the embedded cables. It is also within the spirit of the invention to provide a fabric within the plastic of the belt to counter any tendency toward surface cracking from aged ultraviolet light or residual stresses, as indicated in dash lines in FIGS. 7 and 8.

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description, and all changes that come within the meaning and range of equivalency of the claims are, therefore, intended to be embraced therein.

What is claimed and desired to be secured by United States Letters Patent is:

1. A vehicle endless track having at least one endless flexible belt assembly carrying ground engaging grousers, said belt assembly comprising:
   at least two parallel steel cables each running longitudinally to the belt assembly substantially the full distance therearound, each having a pair of opposing ends;
   means releasably securing each of the pairs of opposing ends together;
   elongate clamping plates installed across the endless belt assembly at intervals therealong, each having a pair of opposite ends;
   a continuous cover of rubberlike material cast about and vulcanized to the cables, the cable end securing means and the clamping plates, opposite end portions of each clamping plate however extending outside said cover of rubberlike material uncovered thereby; and
   means securing the grousers of the endless track to each of the clamping plates at the uncovered end portions thereof, to secure the grousers to the belt assembly.

2. The vehicle endless track of claim 1, wherein the cable end releasable securing means comprises:
   a lacing assembly having a pair of opposed components pivotally secured together pivotally about an axis lateral to the belt assembly;
   means securing one end of each cable to one of the lacing assembly components, and means securing the other end of said cable to the other lacing assembly component; where in
   a portion of the lacing assembly having the pivot axis extends outside said cover of rubberlike material uncovered thereby.

3. The vehicle endless track of claim 1, wherein the grouser securing means comprises:
   bolt and nut means installed through matched sets of holes through the grouser and the uncovered ends of the clamping plates.

4. The vehicle endless track of claim 3, wherein the bolt and nut means comprises:
   a mounting bolt operable through each of the matched sets of holes, said bolt having an enlarged head portion and an elongate unthreaded shank portion extending a substantial distance beyond the hole through the grouser to join with an end portion carrying external threads; and
   a torque nut having an elongate body spanning from the bolt threads to the grouser, having a longitudinal bore therethrough with an internally threaded end portion joining an unthreaded, shank clearing portion, the latter spanning from the threaded portion to an opposite, grouser-bearing end thereof.

5. The vehicle endless track of claim 3, wherein the bolt and nut means comprises:
   a mounting bolt operable through each of the matched sets of holes, said bolt having an enlarged head portion and an elongate shank with at least an end portion carrying external threads;
   a torque nut having a body with a bore, at least a portion of said bore carrying internal threads engaged with the external threads of the bolt shank; and
   a member clamped by the bolt and torque nut to bear against the upper surface of the grouser only along a substantially narrow path aligned longitudinally with the grouser.

6. The vehicle endless track of claim 5, wherein:
   the member clamped against the grouser comprises an elongate wear plate of constant thickness, being arcuate in cross section and carrying holes matching those of the grouser and clamping plate, said wear plate being installed clamped against the grouser by the mounting bolt and torque nut, curving away from a single line of contact with the grouser aligned longitudinally therewith: and
   the torque nut has a cylindrical body with a threaded bore diametral thereto, and is installed in a position of alignment with the wear plate during tightening of the bolt and nut means.

7. The vehicle endless track of claim 2, wherein:
   the torque nut has a cylindrical body with a threaded bore diametral thereto, and is aligned to bear against the grouser along a line longitudinal thereto.

8. The vehicle endless track of claim 1, wherein the continuous cover of rubberlike material further comprises:
   a pair of parallel members integral with said cover and extending thereacross, said members being spaced apart and shaped to create therebetween with said cover a cavity accepting a portion of the grouser inserted thereinto, to stabilize the position of the grouser upon the belt assembly.

9. The vehicle endless track of claim 3, wherein the continuous cover of rubberlike material further comprises:
   a pair of parallel members integral with said cover and extending thereacross, said members being spaced apart and shaped to create therebetween with said cover a cavity accepting a portion of the grouser inserted thereinto, to stabilize the position of the grouser upon the belt assembly.

10. The vehicle endless track of claim 1, further comprising:
    at least one layer of mesh fabric encased within the continuous cover of rubberlike material to prevent surface cracking thereof from residual stresses and from rays of light.

11. The vehicle endless track of claim 3, further comprising:
    at least one layer of mesh fabric encased within the continuous cover of rubberlike material to prevent surface cracking thereof from residual stresses and from rays of light.

* * * * *